May 12, 1959   P. A. NOXON ET AL   2,886,760
AUTOMATIC LANDING APPROACH SERVOMOTOR CONTROL SYSTEM
Filed July 27, 1953   3 Sheets-Sheet 3

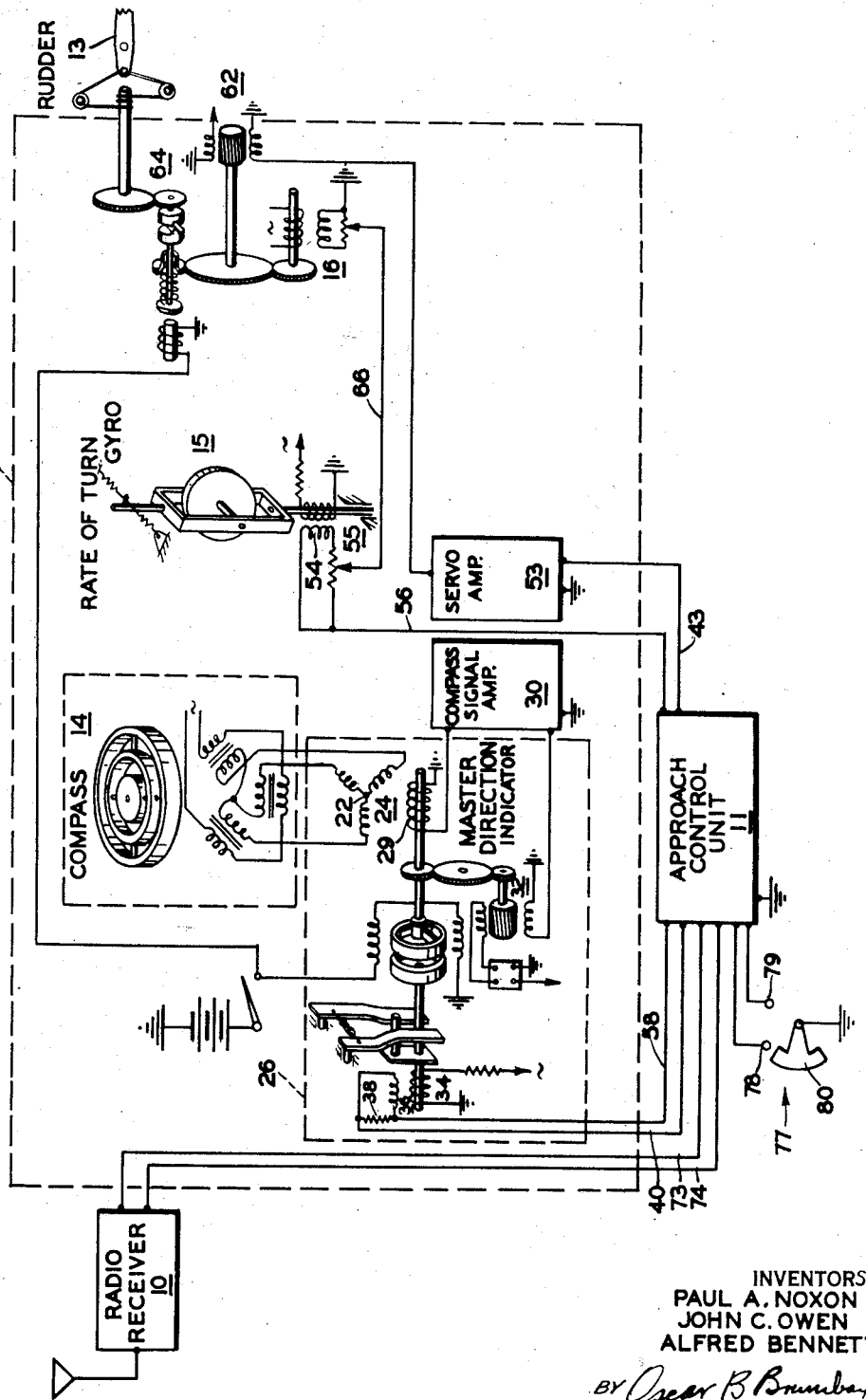

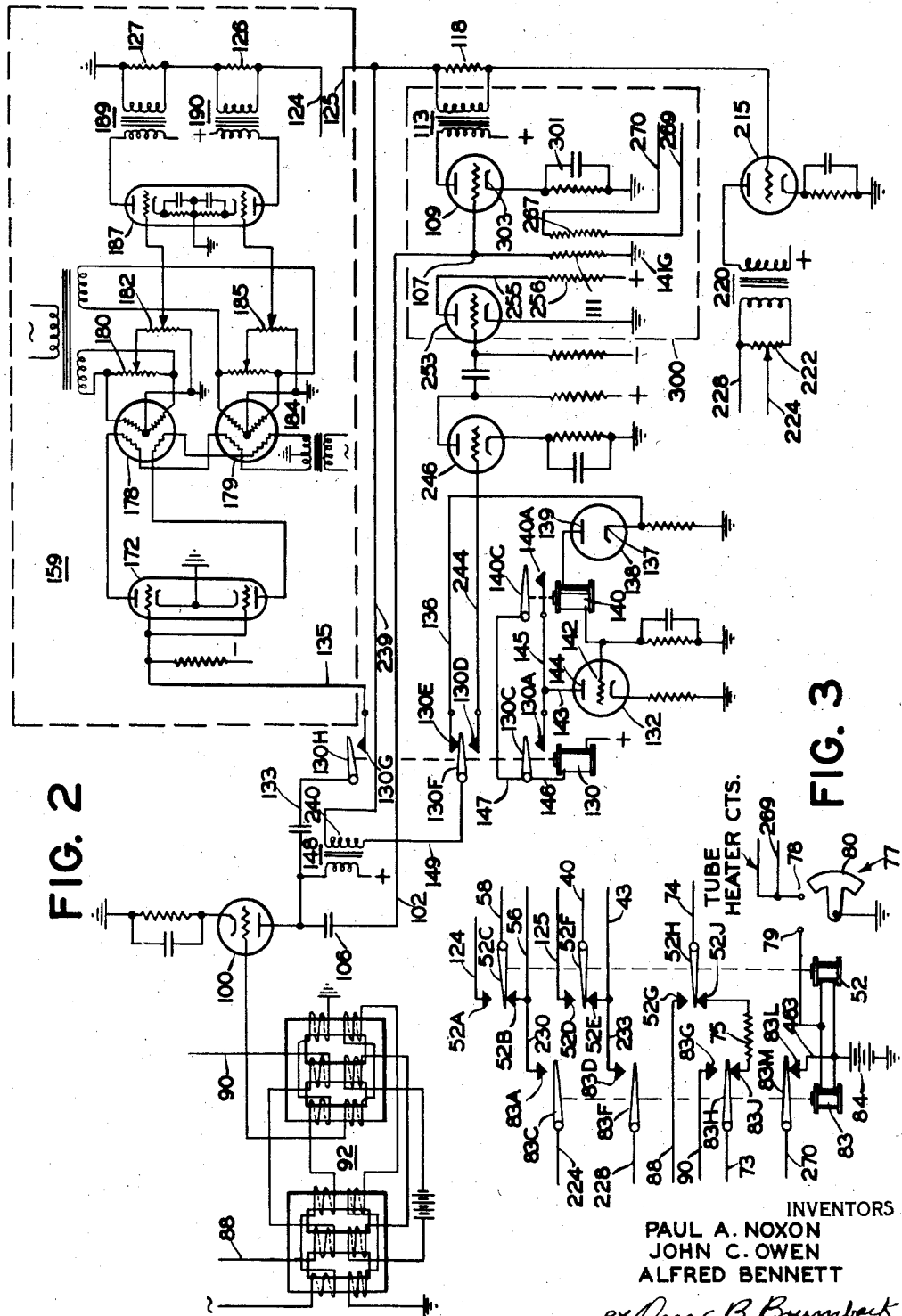

INVENTORS
PAUL A. NOXON
JOHN C. OWEN
ALFRED BENNETT

*Oscar B Brumback*
ATTORNEY

United States Patent Office 2,886,760
Patented May 12, 1959

2,886,760

AUTOMATIC LANDING APPROACH SERVOMOTOR CONTROL SYSTEM

Paul A. Noxon, Tenafly, and John C. Owen, Palisades Park, N.J., and Alfred Bennett, Bronx, N.Y., assignors to Bendix Aviation Corporation, Teterboro, N.J., a corporation of Delaware Application July 27, 1953, Serial No. 370,322

8 Claims. (Cl. 318—489)

The present invention relates generally to control systems and more particularly to control systems for automatically guiding an aircraft or other airborne vehicle to a landing or desired objective.

Conventional instrument landing systems utilize the information received from the radio beams to define the in-flight path of the craft. This information, however, indicates only the number of degrees subtended between a line from the aircraft to the transmitter and a line representing the axis of the beam and not the distance of the craft from the beam axis. Since the linear displacement of the aircraft from the beam axis for a given angular displacement decreases as the aircraft approaches the transmitter, the same control action that corrects for a given angular displacement of a craft that is some distance from the transmitter will cause it to cross the beam axis at too great an angle when the craft is close to the transmitter. Utilizing the angular displacement without correction will result in either low-sensitivity from under control when the craft is remote from the transmitter or instability from over control when the craft is near to it.

An object of this invention, therefore, is to provide a novel control for modifying the sensitivity of an automatic steering system of a vehicle in regards to a signal representing displacement of the vehicle from a reference.

Another object is to provide a novel means for initially turning the craft gradually toward the axis of the beam during the operation of bracketing the beam.

A further object is to provide a novel automatic steering system for directing a craft in a stable manner toward and onto a ground track as defined by a guide beam.

A still further object is to provide a novel automatic control for directing an airborne vehicle by a guide beam in which the control progressively varies its sensitivity to the signal representing angular displacement from the beam as a function of distance of the aircraft from the beam transmitter.

Still another object is to provide a novel automatic control system for maintaining an aircraft on a ground track as defined by a radio beam, the control system being provided with an automatic stability device to sense and reduce progressively the amplitude and frequency of the oscillations of the aircraft about the ground track.

A further object is to provide a novel servo-system wherein the amplitude of a control signal for a servomotor is modified as a function of the amplitude of the control signal.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only, and are not to be construed as defining the limits of the invention.

In the drawings, wherein like reference numerals refer to like parts:

Figure 1 is a diagrammatic illustration of an automatic steering system for an aircraft embodying the novel automatic approach control of the present invention;

Figure 2 is a schematic diagram of the novel automatic approach control of the present invention;

Figure 3 is a schematic wiring diagram of the relay control system of the novel automatic approach control of the present invention;

Figure 4:
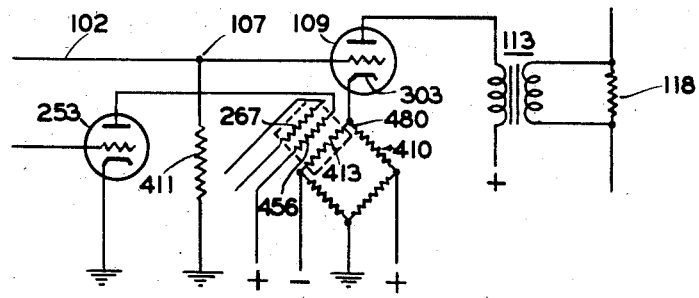
Figure 4 illustrates an embodiment of the invention wherein control of the displacement signal is effected by a thermally responsive bridge arrangement in the cathode line.

In the novel automatic approach control of the present invention a radio receiver 10 in response to a beam from a conventional localizer flight path transmitter develops a direct current output signal. An automatic approach control unit 11 responds to this output and other signals to develop a control signal which is fed into an automatic pilot system 12 to direct the aircraft toward and onto the axis of the beam.

So that an initially large turn signal will not roll the craft over should the craft be displaced some distance from the beam, automatic approach control unit 11 when initially engaged with the automatic pilot system 12 only gradually feeds the control signal into the system. Also, to insure stable operation, any oscillations of the aircraft about the beam axis during the operations of bracketing and following the beam are controlled by progressively reducing the sensitivity of the control unit 11 to the angular displacement signal as the aircraft approaches the beam transmitter.

In automatic pilot system 12, which may be of the character described in U.S. Patent No. 2,625,348 granted to Noxon et al., the control of a rudder 13 is normally derived from an earth inductor type compass 14, a rate of turn gyro 15, and a follow-up device 16. Automatic approach control unit 11 at this time is inoperative.

The signal proportional to the magnetic heading of the craft is developed in compass element 14 and is fed to stator winding 22 of an inductive device 24 in a master direction indicator 26, inducing a signal in rotor winding 29. This signal, after amplification by a vacuum tube amplifier 30, operates a motor 32 which drives rotor winding 29 to a null position relative to stator 22, and at the same time, rotates the rotor winding 34 of a signal transmitter 36 to develop a directional signal within its inductively coupled stator winding 38.

Lead 40 by way of armature 52F and contact 52E (Fig. 3) of relay 52 feeds the directional signal through control unit 11 to an input lead 43 of servoamplifier 53. A rate of turn signal developed in stator 54 of an inductive device 55 by the rate of turn gyro 15 is also fed into the input of the rudder channel of servoamplifier 53 in series with the directional signal by way of a lead 56, a contact 52B (Figure 3) of relay 52, an armature 52C and a lead 58.

The output of amplifier 53 energizes a rudder servomotor 62 which, through a speed reduction system 64, displaces rudder 13 to return the craft to its prescribed course. Motor 62 also operates an inductive follow-up device 16 to develop a follow-up signal which is connected by a lead 66 in series with the rate of turn signal.

The direct current signal from receiver 10 in leads 73 and 74 when control unit 11 is inoperative is impressed by way of armatures 83H and 52H across load resistor 75 interconnecting contacts 83J and 52J. The disposition of this beam displacement signal is determined by a switch 77.

Switch 77 has a pair of terminals 78 and 79 spaced equidistantly along the arc of a circle whose center is the axis of rotation of a switch arm 80. This arm is sufficiently wide and long to engage both terminals simultaneously, so its engagement with terminal 79 will not destroy its engagement with terminal 78. Terminal 78 is connected to the heater circuits of the various vacuum tubes of control unit 11, and terminal 79 is connected through the parallel connected coils of relays 52 and 83 to the positive terminal of a battery 84. Switch arm 80 and battery 84 are grounded.

Sufficient time must be allowed after engaging arm 80 with terminal 78 for the cathode heaters of the various tubes to warm up before engaging control unit 11 with automatic pilot system 12. Thereafter, when the aircraft has intercepted the beam pattern, switch arm 80 is engaged with terminal 79. This energizes relays 52 and 83 (Figure 3), engaging the control unit with the automatic pilot system.

When switch arm 80 and terminals 79 are not in engagement, relays 52 and 83 are not energized; their armatures at that time are in the position shown in the drawing. When switch arm 80 and contact 79 are engaged, relays 52 and 83 are energized. The disengagement of armatures 52H and 83H from contacts 52J and 83J and their engagement with contacts 52G and 83G feeds the signal from receiver 10 by way of leads 88 and 90 to the input of an inverter amplifier 92, Figure 2.

Magnetic inverter amplifier 92 may be of the type described in copending application Serial No. 700,234, filed September 30, 1946, now Patent No. 2,678,419. Responding to the weak direct current signal from receiver 10 which corresponds in polarity and magnitude to the direction and extent of displacement from the beam, the magnetic inverter amplifier develops a workable alternating current output signal whose amplitude and phase corresponds to the magnitude and polarity of the direct current signal. Thus, the amplitude and phase of the alternating current signal corresponds to the extent and direction of the angular displacement between the aircraft and the beam axis. This beam displacement signal is applied to an amplifier tube 100 whose output by way of a lead 102 and blocking condenser 106 is applied to a junction 107 where it is impressed across parallel connections going to an amplifier 109 and to ground 141G through resistor 111. The signal output from amplifier 109 is coupled by transformer 113 across resistor 118.

When relay 52 is energized, armatures 52C and 52F also disengage from contacts 52B and 52E and engage with contacts 52A and 52D which are connected by leads 124 and 125 to resistors 126 and 127 (Figure 2). Armature 52C thus shifts the directional signal from the automatic pilot 12 to automatic approach device 11 where it is added algebraically to the beam displacement signal that appears across resistor 118. As this directional signal seeks to keep the craft on a prescribed heading as it approaches the transmitter, it may cancel the beam displacement signal across resistor 118 before the aircraft can attain the beam axis. Should this occur, the displacement of the aircraft from the beam axis will be a direct function of the original heading of the aircraft with respect to the beam axis. If the heading of the aircraft before the engagement of automatic approach unit 11 is parallel to the beam axis, the craft will attain the axis of the beam with the proper heading. However, when the original heading of the aircraft is perpendicular to the beam axis, maximum displacement of the craft from the beam axis will result.

Developing two integrated signals in network 159, which also must be cancelled out by the directional signal, minimizes the angular displacement of the craft from the beam axis regardless of its original heading. However, the integrated signals, themselves, must be controlled since the correction necessary for the directional signal requires only a small build-up of the integrated signals across resistors 126 and 127. Within the interval of time between the engagement of the control unit 11 and the aircraft's first crossing of the beam axis, the integrated signals may build-up to excessive values and the resulting over-correction cause the aircraft to intercept the beam axis at an unnecessarily large angle, creating a condition of instability. Since the aircraft deviates only a limited amount from the beam on subsequent interceptions, the build-up of the integrated signals is small enough to provide the proper correction for the directional signal.

To prevent excessive build-up, the integrated signals are initiated only when the aircraft attains a preselected position with respect to the beam axis. This has been fully described in the copending application Serial No. 306,022, filed August 23, 1952, now Patent No. 2,745,614, and assigned to the assignee of the present invention. Actuation of relay 130 through triode 132 when the aircraft reaches this preselected position causes armature 130H to engage contact 130G. This connects leads 133 and 135 and initiates the integrated signals.

When relay 130 is not energized, armature 130F engages the contact 130E. A lead 136 connects contact 130E and cathode 137 of a rectifier 138 whose plate 139 is connected through the operating coil of a relay 140 to the grid 142 of a triode 132. So that tube 132 will not operate relay 130 when there is zero signal on grid 142, a lead 143 connects plate 144 to a common lead 145 connecting fixed contacts 130A and 140A. A lead 146 connects one terminal of the operating coil of relay 130 to the common lead 147 connecting armatures 130C and 140C. The other terminal of the operating coil of relay 130 is connected to a direct current plate supply for triode 132.

The energization of relay 140 causes armature 140C to engage contact 140A, energizing relay 130 by connecting its operating coil to plate 144 of triode 132. The engagement of contact 130A and armature 130C completes a holding circuit to maintain the connection between relay 130 and plate 144 although relay 140 is deenergized.

The signal from amplifier 100 is coupled across transformer 148 and by way of leads 149 and 136 applied to cathode 137 of rectifier 138. The current through the rectifier impresses a bias upon grid 142 of triode 132. This bias prevents the flow of sufficient plate current from triode 132 to operate relay 130 until after the aircraft attains a predetermined position with reference to the beam axis. As the aircraft approaches the beam, the displacement signal becomes smaller so the rectified voltage bias on grid 142 will become smaller. When the predetermined position is reached, the bias will be so small as to allow sufficient current to flow through triode 132 to energize relay 130.

Upon the energization of relay 130, armature 130F disengages from contact 130E and engages contact 130D, removing the potential applied to cathode 137 of rectifier 138, deenergizing relay 140 and removing the bias from grid 142 of triode 132. The continuous current flow from triode 132 holds relay 130 in its energized position until a further operation of switch 77 discontinues the operation of automatic approach device 11.

Signal network 159 is inoperative when relay 130 is not energized since an open circuit exists between armature 130H and contact 130G. However, the energization of relay 130 brings armature 130H into engagement with contact 130G so that the signal from amplifier 100 can be applied to discriminator 172.

The grids of discriminator 172 are biased to cut off at zero signal level. When discriminator 172 develops an output, it is passed through a pair of thermal time delay devices 178 and 179 which may be of the type described in U.S. Patent No. 2,463,805, issued to Polye et al. The delay devices differ in their time constants, device 178 having a build-up time of thirty seconds and device 179 of four minutes.

As explained more fully in U.S. Patent No. 2,575,890 issued to Perkins et al., when a beam displacement signal has persisted for thirty seconds the output which develops across potentiometers 180 and 182 builds-up to maximum value. Should the signal persist for four minutes, a signal builds-up across potentiometers 184 and 185. These voltages are amplified in dual amplifier 187 and coupled across transformers 189 and 190 to resistors 127 and 126, respectively.

Discriminator 172 operates under saturation conditions. Accordingly, its output depends only upon the plate potential and not upon the extent of the angular displacement of the craft from the beam. Consequently, the amplitudes of the signals developed across resistors 126 and 127 vary only with the direction and period of time that the aircraft is displaced from the beam axis.

During the process of attaining track of the beam axis, cross winds have an effect equivalent to that encountered when automatic approach device 11 is engaged at headings other than those parallel to the axis of the beam; namely, causing the aircraft to "crab" and follow a ground track displaced from the beam by an amount dependent upon their force. The signals developed across resistors 126 and 127 again act to cancel the directional signal resulting from the change in heading caused by the "crabbing." The beam displacement signal developed across resistor 118 then directs the craft so as to reduce its displacement from the beam axis. A lead 124 conducts the series combination of integrated signals to contact 52A of relay 52.

The algebraic sum of the signals developed across resistor 127, across resistor 126, the directional signal fed by leads 40 and 58, and the beam displacement signal developed across resistor 118 is applied to an isolation tube 215. The output from tube 215 is coupled across a transformer 220 to a potentiometer 222 whose output operates rudder 13 by way of a lead 224 connected to armature 83C of relay 83 (Figure 3) and a lead 228 connected to armature 83F. The energization of relay 83 engages armature 83C and a contact 83A which is connected by lead 230 with a contact 52B of relay 52 and armature 83F with a contact 83D which is connected by a lead 233 with a contact 52E. Thus, engaging the automatic approach unit 11 feeds the control signal developed across potentiometer 222 into the rudder channel input of servo amplifier 53 in series with the signals from the rate of turn gyro 15 and the follow-up device 16 to operate to maintain the aircraft on the beam axis.

The same angular displacement of the craft from the beam axis develops the same beam displacement signal across resistor 118 whether the craft is near or far from the transmitter. However, a smaller control action is required to correct for a given angular displacement when the craft is close to the transmitter than when it is remote from the transmitter. With the beam displacement signal alone, an automatic pilot adjusted for properly controlling an aircraft far away from the transmitter would over control the aircraft as it nears the transmitter. The present invention eliminates over control by reducing progressively the amplitude of the angular displacement signal developed across resistor 118.

For any given beam displacement signal at junction 107, the greater the value of resistor 111, the greater will be the amplitude of the signal appearing on the grid of amplifier 109. Conversely, the smaller the value of resistor 111, the less will be the amplitude of the signal.

The signal potential between capacitor 106 and junction 107 is impressed across the impedance $Z_1$ from capacitor 106 to terminal 107 and the impedance $Z_2$ from terminal 107 to ground. Impedance $Z_2$, of course, is the impedance of resistor 111. Therefore, any signal $E_t$ appearing at terminal 107 bears the relation to the signal $E_c$ appearing at capacitor 106 as:

$$E_t = E_c \frac{Z_2}{Z_1 + Z_2}$$

The conclusions that may be drawn from the above equation are: (1) the more nearly $Z_2$, the impedance of resistor 111, approaches zero, the more nearly signal $E_t$ approaches zero, and (2) the larger the impedance $Z_2$ of resistor 111, the more nearly the signal at terminal 107 approaches the signal $E_t$ at capacitor 106. Thus, the signal strength at terminal 107 determines the signal output from amplifier 109, and merely changing the value of resistor 111 changes the output of tube 109.

The present invention provides a novel arrangement for varying the resistance value of resistor 111 and thereby varying the signal output of amplifier 109. Resistor 111 is a thermistor, i.e., a resistor having a negative temperature coefficient. Accordingly, as resistor 111 is heated, its resistance value drops, thereby causing a corresponding drop in output of tube 109 and a corresponding drop in the amplitude of the signal across resistor 118. The strength of the signal across resistor 118, thus, varies with the heating imparted to resistor 111.

The quantity of heat applied to resistor 111 is made a function of the time and angular amount of displacement of the aircraft from the beam axis as modified by the change in craft heading from a prescribed heading. To this end, a lead 239 connects lead 125 with one terminal of a secondary winding 240 of a mixing transformer 148 so that the algebraic sum of the integrated signals from resistors 126, 127, and the directional signal from inductive device 36 are added with the beam displacement signal which is induced on secondary winding 240 by the signal from amplifier 100. By way of lead 149, armature 130F, and contact 130D of relay 130 which is energized at this time, the signal is applied through lead 244 to an amplifier 246 whose output is given a second stage of amplification in amplifier 253. A lead 255 conducts the signal from amplifier 253 to a heating element 256 which is arranged in a heat exchange relation with resistor 111. The heat generated by the flow of current through heater element 256 decreases the resistance of the thermistor 111, lowering the output of amplifier 109. Since this heating is a function of the current which is proportional to the algebraic sum of the angular displacement signal developed by magnetic amplifier 92, the signals developed across resistors 126 and 127, and the directional signal from inductive device 36, the output of amplifier 109 becomes a function of the time and amount of angular displacement of the aircraft from the beam axis as modified by the change in the aircraft's heading from a prescribed heading.

Since the aircraft should be directed towards the beam axis as quickly as possible during its initial approach, it is not necessary to decrease the sensitivity of automatic approach unit 11 to the angular displacement signal when the aircraft is some distance from the beam. The necessity arises, however, when the aircraft comes close to the beam axis. Rectifier 138, triode 132 and relay 130 are used to determine when to begin decreasing the sensitivity to the beam displacement signal. Thus, current flows through heater element 256 of thermistor 111 only after the energization of relay 130 which occurs when the craft has reached a prescribed position with respect to the beam axis.

An aircraft at the extreme limits of the beam pattern, may be relatively distant from the beam axis, and the initial beam displacement signal may be large. Although suddenly applying this large signal to the automatic pilot could produce such immediate and violent displacement of rudder 13 that the aircraft would be rolled over, the same signal applied gradually to the automatic pilot will displace the rudder the same amount without the danger of rolling over.

The difficulties surrounding the initial application of the angular displacement signal are overcome by a novel means in automatic approach unit 11 whereby the large signal that may be developed from the beam displacement signal during the initial approach is only gradually fed into the automatic pilot 12. To this end, arranged in a heat exchange relation with thermistor 111 is a heater element 267 having one end connected by a lead 269 to terminal 78 of switch 77 and the other end connected to an armature 83M which normally engages a contact 83L of relay 83. A lead 463 connects contact 83L to battery 84.

When switch arm 80 engages terminal 78, the current through heater element 267 heats it thereby decreasing the resistance of thermistor 111 and lowering the output of amplifier 109. Accordingly, any initial beam displacement signal across resistor 118 is small even though the actual displacement of the aircraft from the beam axis is great.

Engaging switch arm 80 with terminal 79 to engage the automatic approach unit 11 energizes relay 83, disengaging armature 83M from contact 83L and stopping the flow of current through heater 267. Resistor 111 has been heated so its resistance value is low; the signal from amplifier 100 flows to ground and only a small voltage is applied to amplifier 109 to develop a correspondingly small signal across resistor 118. As resistor 111 gradually cools, its resistance value increases; the output of amplifier 109 increases correspondingly until as the resistance of resistor 111 reaches normal value, the angular displacement signal across resistor 118 reaches full signal value. The initial small signal with its gradual increase to normal value displaces the rudder surface the amount necessary to turn the craft toward the beam axis without the danger of rolling the craft over.

In the operation of automatic approach unit 11, radio receiver 10 is tuned to the frequency of the localizer beam transmitter as the aircraft approaches its destination and switch arm 80 is engaged with terminal 78 to warm up the heaters of the various tubes and heater 267. The speed of the aircraft is reduced to approach speed, and the aircraft is headed to intercept the localizer flight path beam pattern, and upon such interception is brought to a heading parallel to the beam axis. Switch arm 80 is engaged with terminal 79 to connect the automatic approach device 11 to the automatic pilot 12.

As a result of the coaction of thermistor 111 and heater 267, the turn signal representing the angular displacement of the craft from the beam axis is decreased. As the thermistor cools, the turn signal gradually displaces rudder 13 to direct the aircraft gradually toward the beam axis.

As the aircraft reaches a predetermined position with respect to the beam axis, relay 130 is energized, and formation of integrated signals across resistors 126 and 127 is initiated. At the same time, the signals from mixing transformer 148 are applied to heater 256 thereby decreasing the sensitivity of automatic approach unit 11 to the angular displacement signal. Thus, as the displacement signal becomes greater for a given linear displacement of the craft as it approaches the transmitter, the decreased sensitivity to this signal dampens the turn signals; and the aircraft is brought to and maintained on a ground track as defined by the axis of the beam. The compass signal at the same time operates to maintain the craft heading parallel to the beam axis. Should the aircraft not be brought to a heading parallel to the beam axis upon the interception of the beam, the signal potentials developed across the resistors 126 and 127 combine to cancel out the directional signal. This permits the beam displacement signal to maintain the aircraft on a ground track that is displaced a minimum amount from the beam axis.

Figure 4 illustrates an embodiment of control unit 300 wherein the thermistor 111 of Figure 2 is replaced with a conventional fixed resistor 411. The resistance capacitance unit 301, Figure 2, connected to the cathode 303 of amplifier tube 109 has been replaced with a bridge circuit 410 to provide a novel control for the output of amplifier 109. This bridge is set to give normally the correct operating bias on the cathode 303 of the tube. One arm of bridge 410 is a thermistor 413 which has heating element 456 in heat exchange relationship with it. As the output from amplifier 253 is applied to heater 456, the temperature of heater 456 rises because of current flow through it; and the resistance value of thermistor 413 decreases. Junction 480 changes potential thereby changing the operating characteristics of tube 109 and consequently its output. Thus, the beam displacement signal is controlled as a function of the signal from mixing transformer 148.

Figure 5:
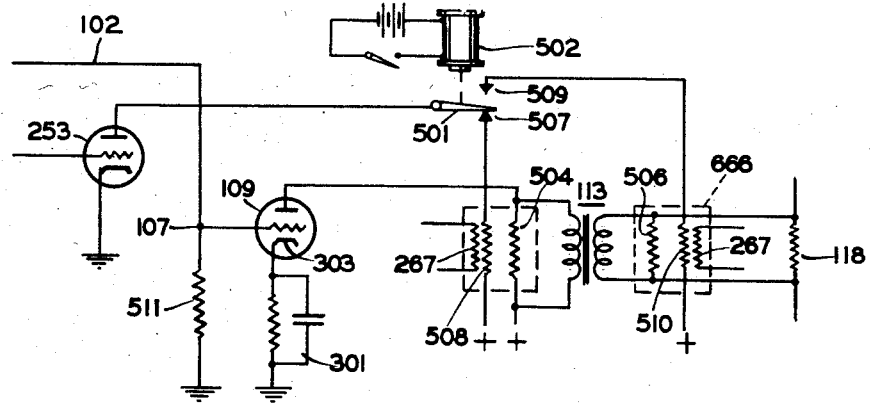
Figure 5 illustrates an embodiment of the invention wherein a thermally responsive resistance control is employed across a signal coupling; and, Figure 6 illustrates an embodiment of the present invention wherein a thermally responsive bridge element is employed to control the signal output.

In Figure 5, an embodiment is shown having two devices for controlling the beam displacement signal as a function of the output of mixing transformer 148. Again, the thermistor 111 of Figure 2 has been replaced by a conventional fixed resistor 511. The output of tube 253, is connected to the armature 501 of a conventional relay 502. A thermistor 504 has been placed across the primary winding of transformer 113 and a thermistor 506 has been placed across its secondary winding. One contact 507 of relay 502 is connected to the heating element 508 of thermistor 504 while the other terminal 509 is connected to the heating element 510 of thermistor 506. The output from amplifier 253 then may selectively be sent through either of the heaters of the thermistors 504 and 506 to decrease the resistance value of the resistors across the windings, thereby shunting the windings to vary the strength of the displacement signal appearing on resistor 118.

Figure 6:
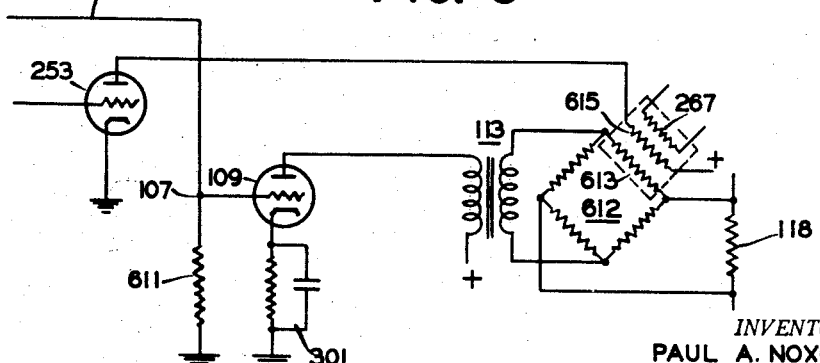

In Figure 6, an embodiment of the invention is illustrated wherein thermistor 111 of Figure 2 has again been replaced by a conventional fixed resistor 611. A Wheatstone bridge 612 is placed across the secondary winding of transformer 113 of Figure 2 with the terminals of the secondary winding connected across the diagonals of Wheatstone bridge 612 so as to form its energy source. Resistor 118 is connected across the diagonals of Wheatstone bridge 612 defining its output. One resistor 613 of bridge 612 is a thermistor whose heating element 615 receives the output of amplifier 253 of Figure 2.

Normally bridge 612 is unbalanced so the output thereof across resistor 118 corresponds to the output of amplifier 109. However, the signal received from amplifier 253 heats element 615 raising the temperature of thermistor 613 and decreasing its resistance thereby bringing the Wheatstone bridge closer to a balanced condition and resulting in a decrease in output or strength of signal across resistor 118.

Obviously in each of the above embodiments, a heating element such as illustrated at 267, Figure 2, may also be used as a heater element for the thermistor to keep large initial turn signals from being introduced into the automatic pilot system.

As will now be apparent to those skilled in the art, a novel and desirable navigational device has been provided for automatic steering systems that is particularly useful for instrument or blind landing purposes and which utilizes a controllable signal dependent in phase and amplitude upon the angular amount and direction of displacement of the craft relative to the beam axis to be followed.

Although several embodiments of the invention have been illustrated and described in detail, various other changes and modifications in the form and relative arrangement of parts which will now appear to those skilled in the art, may be made without departing from the scope of the invention.

We claim:

1. In an automatic pilot system for a vehicle having a movable control surface thereon for controlling said vehicle about an axis thereof, a servomotor operatively connected with said surface for moving the latter, reference means on said vehicle for developing a first signal corresponding to the angular displacement of said vehicle from a predetermined reference, means operably connected with said reference means and responsive to said displacement signal for developing a second signal corresponding to the length of time said vehicle is displaced from said predetermined reference, means on said craft for developing a third signal corresponding to the deviation of said craft from a predetermined heading, summation means interconnecting said signal developing means for algebraically combining said signals, means connected with said first signal developing means and said summation means for modifying the first signal as a function of said signal combination, means for algebraically summing the resulting modified signal and the second and third signals, and means connecting said last-mentioned means and the servomotor for operating the latter.

2. In an automatic control system for a vehicle reference means for developing a first signal corresponding to the displacement of said vehicle from a predetermined reference, means operably associated with said reference means and responsive to said displacement signal for developing a second signal corresponding to the length of time said vehicle is displaced from said predetermined reference, means interconnecting said signal developing means for algebraically combining said signals, and further means interconnecting said signal combining means and said first signal for modifying said first signal as a function of the signal combination, said signal combining means including a coupling means for coupling the modified signal to said second signal and said further means including a normally unbalanced Wheatstone bridge across said coupling means having a thermistor for one arm and a means connecting said signal combination with said thermistor to heat said thermistor as a function of said signal combination to balance the bridge.

3. An automatic steering system for a vehicle, having a movable control surface thereon, a servomotor operably connected with said surface for moving the latter, reference means for developing a control signal for said servomotor, means operatively connected with said signal developing means for transmitting said control signal to said servomotor including a means for modifying said signal comprising a thermionic tube having a cathode, anode, and grid, means for impressing said control signal on said grid, means for obtaining the resulting signal from said anode for said motor, and thermally responsive means experiencing a change in temperature in response to said control signal for selectively varying the bias on said cathode.

4. An automatic steering system for a vehicle having a movable control surface thereon, a servomotor operatively connected with said surface for moving the latter, reference means for developing a control signal for said servomotor, means connecting said reference means with said servomotor for operating the latter by said signal including a thermionic tube having a cathode, anode and grid, means for impressing said control signal on said grid, means for operating said servomotor from the resulting signal from said anode, and means for selectively vary the bias on said cathode comprising a normally balanced Wheatstone bridge connected to said cathode, and means responsive to said control signal for changing the balance of said bridge whereby said bias is varied.

5. An automatic steering system for a vehicle having a movable control surface thereon, a servomotor operably connected with said surface for moving the latter, reference means for developing a control signal for said servomotor, means operably connected with said reference means for transmitting said control signal to said servomotor, means operatively connected with said transmitting means for modifying said signal including means for coupling said signal to said servomotor, a thermistor shunting said coupling means, and means for heating said thermistor.

6. An automatic steering system for a vehicle having a movable control surface thereon, a servomotor operably connected with said surface for moving the latter, reference means for developing a control signal for said servomotor, means operably connecting said reference means with said servomotor including a normally unbalanced Wheatstone bridge having an input connected to said reference means for receiving said signal and an output connected to said motor for conducting said signal thereto, one of said bridge arms having a variable resistance, and means connecting said arm and said reference device for varying said output as a function of said signal.

7. In an automatic control system for a vehicle having a movable control surface thereon, the combination comprising a servomotor operatively connected with said surface for moving the latter, reference means for developing a first signal, means operatively associated with said reference means and responsive to said first signal for developing a second signal, means for algebraically combining said first and second signals, means connected with the reference means and combining means for modifying the first signal as a function of the combined signals, means for algebraically summing the modified signal and said second signal, and means connecting said last-mentioned summing means and said servomotor for operating the latter, said signal modifying means including a first circuit element responsive to the combined first and second signals, and a second circuit element responsive to the first signal and to the operation of the first circuit element for developing the modified signal.

8. In an automatic pilot system for a vehicle having a movable control surface thereon, a servomotor operatively connected with said surface for moving the latter, reference means for developing a first signal corresponding to the angular displacement of said vehicle from a predetermined reference, means operably associated with said reference means and responsive to said first signal for developing a second signal corresponding to the time duration of said first signal, means on said vehicle for developing a third signal corresponding to the deviation of said craft from a predetermined heading, summation means interconnecting said signal developing means for algebraically combining said signals, and means connected with said reference means and said summation means for modifying said first signal as a function of said algebraically combined signals, said last-named means including means for algebraically summing the resulting modified signal and said second and third signals, and means connecting said last-mentioned summing means and said servomotor for operating the latter, said signal modifying means including a first circuit element responsive to the combined first, second and third signals, and a second circuit element responsive to the first signal and to the operation of the first circuit element for developing the modified signal.

References Cited in the file of this patent

UNITED STATES PATENTS

| | | |
|---|---|---|
| 2,179,260 | Jones | Nov. 7, 1939 |
| 2,217,267 | Eisele | Oct. 8, 1940 |
| 2,439,044 | Ferrill | Apr. 6, 1948 |
| 2,575,890 | Perkins et al. | Nov. 20, 1951 |
| 2,588,382 | Hammond | Mar. 11, 1952 |
| 2,592,173 | Noxon et al. | Apr. 8, 1952 |